G. RICHARDSON.

Bobbin for Spinning-Machines.

No. 6,416.

Reissued May 4, 1875.

Witnesses.

S. W. Pipes

L. N. Köller

George Richardson by his attorney.

R. Eddy

THE GRAPHIC CO. PHOTO-LITH. 39 & 41 PARK PLACE, N.Y.

UNITED STATES PATENT OFFICE.

GEORGE RICHARDSON, OF LOWELL, MASSACHUSETTS, ASSIGNOR OF ONE-HALF INTEREST TO THE LOWELL MACHINE-SHOP.

IMPROVEMENT IN BOBBINS FOR SPINNING-MACHINES.

Specification forming part of Letters Patent No. 148,625, dated March 17, 1874; reissue No. 6,416, dated May 4, 1875; application filed November 9, 1874.

DIVISION B.

*To all whom it may concern:*

Be it known that I, GEORGE RICHARDSON, of Lowell, of the county of Middlesex and State of Massachusetts, have invented a new and useful Improvement in Mechanism for Spinning; and do hereby declare the same to be fully described in the following specification and represented in the accompanying drawings, of which—

Figure 1:
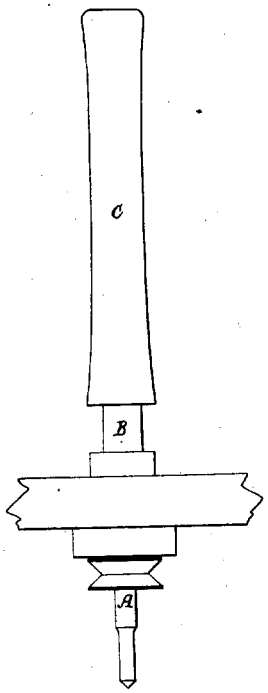
Figure 3:
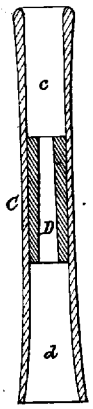
Figure 2:
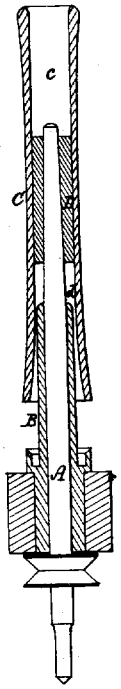

Figure 1 denotes a front elevation, Fig. 2 a vertical section of a spinning-frame, spindle, and bobbin, provided with my improvement, and arranged with a bolster. Fig. 3 is a longitudinal section of the bobbin.

In carrying out my invention I make a bobbin with an adhesive spindle bearing at or near its middle, and in applying such bobbin to the spindle and bolster I extend the bolster up within the bobbin or the lower chamber thereof, and also extend the spindle above the bolster and terminate such spindle at or near the bottom of the upper chamber of the bobbin, or top of the adhesive bearing constituting the bottom of said chamber.

The bobbin, as shown, has two chambers, and is open at its ends or unprovided there with any spindle bearing or bushing; the two chambers having between them one of such bearings, arranged at or about the middle of the bobbin, as in the aforesaid drawings, in which A denotes the spindle, B the bolster, and C the bobbin.

The adhesive bearing arranged between the two chambers *c d* of the bobbin is shown at D as fitted to bear on the spindle or part thereof projecting above the bolster B. The said bearing is at the middle of the bobbin, and forms the upper terminus of the lower chamber and the lower terminus of the upper one, the latter chamber being open at its upper end. The lower chamber is shown as open at its lower end.

With the aforesaid bobbin applied to the spindle and bolster, the portion of the spindle that extends above the bolster is shorter than the bobbin, and instead of being carried up to the top of the bobbin, terminates at or near the foot of the upper chamber thereof, with the bolster extended up into the lower chamber of the bobbin, and terminating at or near the top of such chamber.

I am aware of the subjects of the two United States Patents No. 113,575 and No. 102,587; the first being granted to Jacob H. Sawyer, and the last to Oliver Pearl, and do not claim either of such subjects.

In my invention I dispense entirely with the adhesive bearing of the lower end of the bobbin, such adhesive bearing being in my opinion an essential feature of said Pearl's invention, and while I extend the bolster up within the chamber in the lower part of the bobbin, as Sawyer does in his invention, I do not carry the spindle up to the top of the bobbin, as he does, but terminate it at or near the bottom of the upper chamber.

With my invention I obtain a much less extension of the spindle above the bolster, and consequently a lighter spindle than can be had with a foot-bushing or bearing to the bobbin, without the bolster being extended up within a chamber in the bobbin. I also obtain either a longer bobbin or a shorter bolster and spindle, than is the case when the spindle is extended up to or near the top of the bobbin, and the bolster goes up within the bobbin to or about the middle thereof.

My invention thus is productive of new and important results, for the shorter the spindle and bolster the less liability will there be of lateral vibration, the less will the machinery cost, the lighter it may be made, and the greater will be the speed to which the spindle may be run with safety and economy.

I claim as my invention as follows, viz:

The ring-spinning bobbin, constructed with the middle adhesive spindle-bearing D, and and the two chambers *c d*, open at their outer ends, without having at either of such ends an adhesive spindle-bearing, all being substantially as specified.

GEO. RICHARDSON.

Witnesses:
R. H. EDDY,
J. R. SNOW.